March 19, 1929.  J. F. HOWARTH ET AL  1,706,162
AMUSEMENT MOTOR VEHICLE
Filed Nov. 2, 1926  2 Sheets-Sheet 1
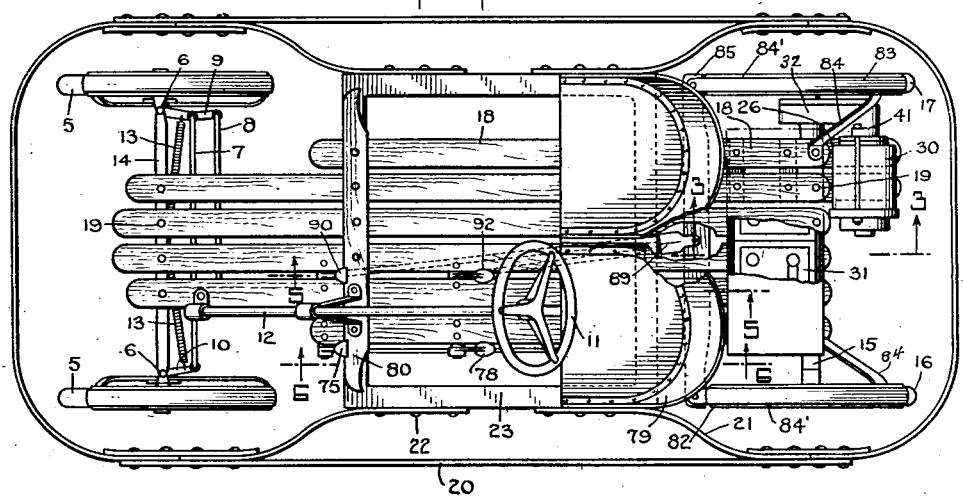
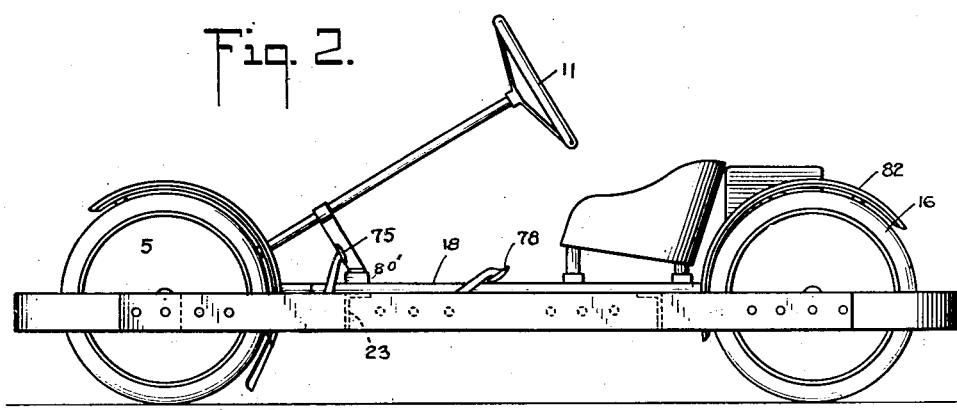
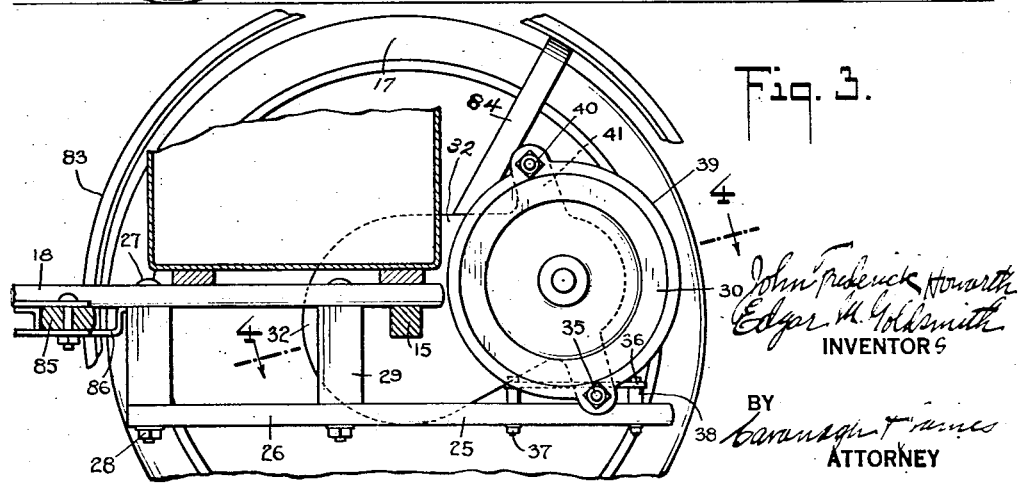

March 19, 1929.   J. F. HOWARTH ET AL   1,706,162
AMUSEMENT MOTOR VEHICLE
Filed Nov. 2, 1926    2 Sheets-Sheet 2
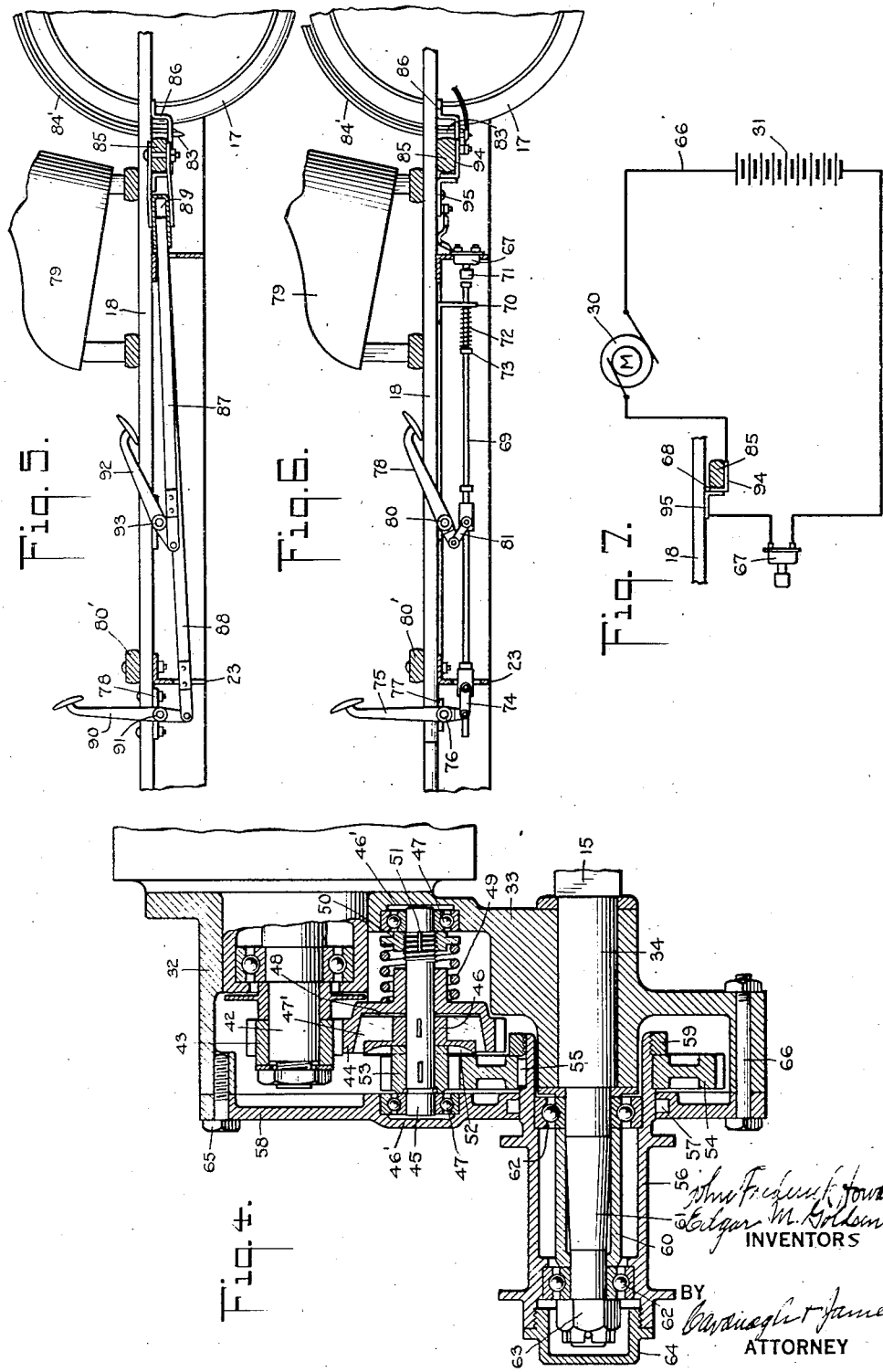

Patented Mar. 19, 1929.

1,706,162

UNITED STATES PATENT OFFICE.

JOHN FREDERICK HOWARTH AND EDGAR M. GOLDSMITH, OF NEW YORK, N. Y., ASSIGNORS, BY MESNE ASSIGNMENTS, TO AUTOMOTIVE STANDARDS, INC., A CORPORATION OF DELAWARE.

AMUSEMENT MOTOR VEHICLE.

Application filed November 2, 1926. Serial No. 145,743.

This invention relates to improvements in motor vehicles adapted for use in amusement parks. Operating and other conditions, in amusement parks, where motor vehicles are used for amusement purposes, lend themselves readily to bring about frequent collisions among the vehicles while these are operating therein. In fact these collisions, accidental or otherwise, play no small part in the amusement of the patrons. It is therefore essential and in order to hold operating expenses at a minimum, that the vehicles be constructed so as to be practically damage proof in the presence of ordinary collisions. This property on the part of the vehicles also provides for the safety of the operators thereof. In connection with the present invention a structure is proposed which has for its general object to render a motor vehicle invulnerable when colliding with objects and with other and similarly constructed vehicles.

The above and other objects are accomplished by instrumentalities pointed out in the following specification. The invention is clearly defined in the claims.

A satisfactory embodiment of the invention is illustrated in the accompanying drawings forming part of the specification and in which Figure 1, is a plan view of the invention showing a part thereof broken away to disclose the relation of other parts.

Figure 2, is a side elevation of Figure 1.

Figure 3, is an enlarged detail longitudinal section taken approximately on the line 3—3 of Figure 1, and looking in the direction of the arrows.

Figure 4, is a detail sectional plan view taken on the line 4—4 of Figure 3, and looking in the direction of the arrows.

Figure 5, is a detail longitudinal section on the line 5—5 of Figure 1.

Figure 6, is a view similar to Figure 5 on the line 6—6 of Figure 1.

Figure 7 is a largely diagrammatic showing of the power circuit.

The front wheels 5—5 are arranged to rotate upon the spindles of the steering knuckles 6—6 which are of ordinary construction and operable by an ordinary vehicular steering gear made up of the links 7—8, levers 9—10, steering wheel 11, and post 12. In this connection however there are provided a pair of retractile springs 13, for assisting in restoring the front wheels 5—5 to their normal straight ahead positions after the said wheels have been operated for directing the vehicle to make a right or left turn. The inner ends of springs 13—13 may be connected to the central portion of front axle 14, and the respective outer ends of the springs connected to the levers 9 and 10, as shown and for the purpose stated. The rear axle 15, is stationary and the respective rear wheels 16—17 rotatable thereon. The body 18 is of the buckboard type, and the opposite end portions thereof are fixedly secured as by bolts 19 to the front and rear axles.

Coming now to the present invention, 20 indicates generally a horizontally disposed resilient metal bumper, herein shown as being formed of material corresponding to that usually employed for motor vehicle bumpers. According to the present invention, bumper 20 takes the form of a substantially rectangular shaped frame disposed substantially in horizontal alinement with the front and rear axles and extending continuously around the opposite end and side portions of the vehicle. The end and side portions of frame 20 are disposed in spaced relation to the adjacent end and side portions of the vehicle in order to provide a clearance for lateral and longitudinal movement on the part of the bumper. The bumper is yieldingly supported by a plurality of leaf springs 21, disposed with their respective end portions rigidly secured as by rivets 22, to the opposite corner portions of the bumper and to the opposite corner portions of a rigid bed frame 23. Angle iron or its equivalent is employed for bed frame 23, which is disposed transversely of the central portion of the buckboard body 18. Bed frame 23 is bolted or otherwise rigidly secured to body 18, and the said frame, by virtue of its rigidity, reinforces body 18, and provides a rigid support for the leaf springs 21. In this way bumper 20 is floatingly mounted and movable bodily in directions laterally and longitudinally of the frame 18. A horizontally disposed resilient motor support 25, depends from a rear corner portion of body 18, adjacent to rear wheel 17. This support 25 is herein shown as being made up of a plurality of slats 26, similar to those employed for body 18, and disposed with their forward end portions connected to slats of the rear end portion of the body by bolts 27, secured by nuts 28; a plurality of spacers 29, being provided for holding the parts in spaced relation. The rear end portions of slats 26 project rearwardly into the clearance beyond the rear end portion of body 18, and provide a platform support for a motor 30. The motor is herein shown as being of the ordinary electric type and operated by the current from a storage battery 31, superimposed on the rear end portion of body 18. An end portion of motor 30 is disposed adjacent to rear wheel 17 and the said end portion is rigidly connected to one end portion of a transmission casing 32 which extends forwardly and into the space between body 18, and rear wheel 17. The forward end portion of casing 32 located between body 18 and rear wheel 17 is provided with a transverse bearing 33, in which is disposed a cylindrical extension 34 of the adjacent end portion of rear axle 15. In this way full advantage is taken of the yieldability afforded by support 25; it being obvious that when the support 25 vibrates vertically in response to a jar transmitted through the body 18, the motor through the connection between the transmission casing and the portion 34 of the axle is free to turn upon the latter as an axis. Motor 30 is detachably and rigidly connected to support 25 by means of a lower tie rod 35, disposed underneath a strap 36, extending parallel to support 25 and suitably secured thereto as by bolts 37, extending through spacers 38. Tie rod 35 passes through a perforated ring 39, peripherally disposed upon an end of the casing of motor 30, and also through a radially disposed lower lug carried by transmission casing 32. Ring 39 is retained by an upper tie bar 40, passing through a perforation in the ring and through a radially disposed upper lug 41, carried by transmission casing 32. An end portion 42 of the armature shaft of the motor extends into the rear end portion of casing 32, and a toothed pinion 43, keyed to end portion 42 of the armature shaft meshes with a toothed wheel 44 loosely mounted on a horizontally disposed jack shaft 45. Casing 32 has oppositely disposed sockets 46 in which are disposed ball bearings 47 for the ends of jack shaft 45. A friction clutch is provided for frictionally driving jack shaft 45. In the present instance a hub 46 is keyed to shaft 45 and carries at one end a circular block 47 of fibrous material. The periphery of the block is bevelled to correspond with the flared or bevelled side wall of an axially disposed depression 48 in the adjacent face of the toothed gear wheel 44. A compression spring 49 surrounds jack shaft 45 and is disposed to bear upon wheel 44. The said spring operates to yieldingly hold the bevelled surfaces in frictional binding contact; the normal tension of the spring 49 being adjustable by means of an interiorly screw threaded ring 50, adjustably disposed upon a screw threaded portion 51, of the jack shaft. Hub 46 has a flange 52 thereon which is rigidly connected to block 47' so as to cause the rotation of the block with the shaft, and a toothed pinion 53 is keyed to the jack shaft and disposed outwardly beyond flange 52. A toothed gear wheel 54, disposed co-axially with the portion 34 of the rear axle 15, meshes with pinion 53 and is keyed or otherwise rigidly secured as at 55 to the inner end portion of the hub 56 of rear wheel 17. Hub 56 extends through a transverse opening 57 in the removable cover plate 58 of transmission casing 32, and is retained against outward displacement by a nut 63, screwed upon the screw threaded spindle 61 and also by ball bearing 62. A distance piece 60 surrounds the spindle 61, on an end of axle 15, the ball bearings 62 being also provided for hub 56 and disposed at the opposite end portions of the distance piece. The hub is surrounded by a removable cap 64. Cover plate 58 is detachably connected to casing 32 as by screws 65 and bolts 66. From the foregoing it is to be noted that when the parts are positioned as shown in Figure 4, the several toothed wheels and clutch operate to transmit motion from the armature shaft 42 to hub 56, and rear drive wheel 17. It is further to be noted that the provision of the clutch enables the motor to overcome more easily the inertia of the vehicle in the initial starting thereof. In this connection it is to be noted that during the initial turning movement of motor shaft 42, and when the vehicle is at rest, the inertia of the vehicle overcomes the friction between the parts 47 and 48, whereupon spring 49 yields and part 48 slips around part 47'; this reduces the load on motor shaft 42 and enables the motor to pick up rapidly so that ultimately sufficient power is transmitted to part 45 to permit the same to overcome gradually the inertia of the vehicle by intermittently moving into and out of contact with part 47'. While the vehicle is under way parts 47' and 48 are in constant contact. The motor circuit is indicated by the wiring 66, shown diagrammatically in Figure 7 where 30 indicates the motor, 31 the storage battery and 67 and 68 a pair of switches connected in the motor circuit. Sixty-seven (67) is an ordinary kick switch secured to the rear end portion of frame 23 as shown in Figure 6 or in any other convenient location. A plunger rod 69, disposed longitudinally of body 18 is supported from the under side thereof by a bracket 70 and by the forward end portion of frame 23. The rear end of rod 69 is in alinement with button 71 of switch 67 and is normally held in spaced relation to the button by a spring 72, disposed between bracket 70, and a collar 73 on the plunger rod. The forward end portion of the rod carries a link 74 which is pivotally connected to the lower end of a pedal 75, mounted for turning upon an axle 76, disposed transversely of the under side of body 18 and supported by bearings 77 and 78. Pedal 75 is disposed in alinement with driver's seat 79 and forwardly of foot board 80' and extends upwardly beyond the slats of body 18, and is located within convenient reach of the foot of a driver of ordinary adult size. A second pedal 78, is located adjacent to the driver's seat 79 and is mounted for turning movement on an axle 80, parallel with axle 76. The pedal 78 is connected by a link 81 to rod 69. The provision of links 74—81 permits either of the pedals to be folded downwardly and out of the way when not in use. From the foregoing it is obvious that rod 69 is operable by either pedal to operate kick switch 67 to close the motor circuit. The brakes 82 and 83 for the rear wheels 16 and 17 form extensions of the forward end portions of the rear mud guards 84' of the vehicle, and are supported by brackets 84, connected to the body 18. The metallic segments constituting these brakes are resilient and located adjacent to the rear tires so that upon flexure portions of the segments are moved into frictional contact with the tires and by binding thereon produce the ordinary brake action. The forward ends of the segments are adjacent to the opposite ends of a brake beam 85, disposed transversely of the under side of the body 18, and mounted for sliding movement in a direction longitudinally of the body in a yoke 86, secured to the body 18. A pair of brake rods 87—88 have their rear ends slidable in the sockets of a sleeve 89, extending forwardly from the intermediate portion of beam 85. The forward end of brake rod 88 is pivotally connected to the lower end of a brake pedal 90 mounted upon an axle 91, disposed so as to support pedal 90, in front of foot board 80', and adjacent to pedal 75. Brake rod 87 is relatively short and pivotally connected at its forward end to a second brake pedal 92, mounted upon an axle 93, adjacent to axle 80. This construction, as in the case of pedals 75 and 78, provides for the operation of the brakes by grown persons or by children, and further provides for folding either of the pedals 90—92 downwardly and out of the way whenever desired. It is to be noted that when either of the pedals 90—92 is in the upright position foot pressure thereon operates to move beam 85 rearwardly and thereby operate the brakes; the latter operate by their own resiliency to restore the parts to their normal positions upon the release of the brake pedal in the usual manner. When brake beam 85 is in normal position an element 94 of switch 68 carried thereby makes contact with another element 95 of said switch carried by body 18, all of which is shown in Figure 7. When beam 85 is moved rearwardly from the position shown in Figure 7 to apply the brakes, element 94 moves away from element 95, whereupon, the motor circuit is broken. With this construction the operator is not required to cause kick switch 67 to open in order to check the progress of the vehicle during an application of the brakes, and when the brakes are in released positions, the opening and closing of the motor circuit may be effected by operating the kick switch.

From the foregoing description, the operation of the device of this invention will be readily understood. It is to be noted that in a head-on or other form of collision with another vehicle of similar construction, or other object, the bumpers of both vehicles operate to absorb considerable of the shock and the yieldability of the motor support reduces the strain upon the motor. In a case where the vehicle is brought to a sudden standstill in collision and before the driver can cut off the power part 47' of the clutch will move away from part 44 and thereby remove the load from the motor.

Although we have shown and described one embodiment of the present invention it is to be understood that the same is susceptible of many changes and we reserve the right to employ such of these as may come within the scope of the appended claims.

We claim:

1. The combination with a motor vehicle having a passenger carrying body, of a bumper frame surrounding and spaced from the body, and spring leaves connecting the frame to the body and shaped to permit movement of the bumper frame as a whole laterally, longitudinally and obliquely with respect to the body.

2. In an amusement device a motor vehicle having a passenger carrying body, a rigid bed frame rigidly secured to the body and disposed transversely thereof, and a resilient bumper frame surrounding the body and connected to opposite portions of the bed frame.

3. In an amusement device a motor vehicle having a passenger carrying body, a resilient bumper frame surrounding the vehicle and resilient supporting members connecting the bumper frame with opposite portions of the body.

4. In an amusement device a motor vehicle having a passenger carrying body, a rigid bed frame rigidly secured to the body and disposed transversely thereof, a resilient bumper frame surrounding the vehicle and resilient supporting members connecting opposite portions of the bumper frame with oppositely disposed portions of the bed frame.

5. The combination with a motor vehicle having a passenger carrying body, of a bumper frame surrounding and spaced from the body and comprising connected leaf springs, two of said leaf springs being respectively arched across the front and rear of the body, and leaf springs connecting the bumper frame to the body.

Signed at New York city, in the county of New York and State of New York, this 1st day of October, A. D. 1926.

JOHN FREDERICK HOWARTH.
EDGAR M. GOLDSMITH.